United States Patent [19]

Lindner et al.

[11] 4,417,026

[45] Nov. 22, 1983

[54] THERMOPLASTIC POLYESTER MOULDING COMPOSITIONS HAVING IMPROVED TOUGHNESS

[75] Inventors: Christian Lindner, Cologne; Rudolf Binsack, Krefeld; Dieter Rempel; Karl-Heinz Ott, both of Leverkusen, all of Fed. Rep. of Germany

[73] Assignee: Bayer Aktiengesellschaft, Leverkusen, Fed. Rep. of Germany

[21] Appl. No.: 310,147

[22] Filed: Oct. 9, 1981

[30] Foreign Application Priority Data

Oct. 16, 1980 [DE] Fed. Rep. of Germany ....... 3039115

[51] Int. Cl.³ ............................................. C08L 51/00
[52] U.S. Cl. ..................................... 525/64; 524/504; 524/513; 524/539; 525/69
[58] Field of Search ................... 523/64, 69; 524/504, 524/539, 513

[56] References Cited

U.S. PATENT DOCUMENTS 4,034,013  7/1977  Lane ..................................... 525/64
4,283,326  8/1981  Charles et al. ........................ 525/64

Primary Examiner—J. Ziegler
Attorney, Agent, or Firm—Connolly and Hutz

[57] ABSTRACT

Graft copolymers having a diene rubber core surrounded by at least two different shells improve the impact strength under multi-axial stress of thermoplastic polyester moulding compositions.

10 Claims, No Drawings

THERMOPLASTIC POLYESTER MOULDING COMPOSITIONS HAVING IMPROVED TOUGHNESS

This invention relates to impact-resistant mixtures of thermoplastic saturated polyesters of aromatic dicarboxylic acids and aliphatic or cycloaliphatic diols and graft copolymers having a diene rubber core surrounded by at least two different shells.

Thermoplastic polyesters have become important in the field of fibres and in the field of moulding compositions because of the valuable technical properties thereof, such as rigidity, hardness, abrasion-resistance, dynamic strength and heat resistance. This applies, in particular, to the partially crystalline thermoplastic polyesters, such as polyethylene terephthalate, poly(1,4-butylene terephthalate) and poly(1,4-cyclohexyl methylene terephthalate). These moulding compositions have the disadvantage of insufficient impact resistance under multi-axial stress in many cases.

There have been numerous proposals for increasing the toughness of thermoplastic polyesters by adding other polymers, in particular those based on modified elastomers and polyolefins. However, the proposed measures have the disadvantage that the improvement in toughness is accompanied by a substantial deterioration in other properties, for example, the above-mentioned properties. In addition, the desired improvement in multi-axial impact strength is not achieved.

German Auslegeschrift No. 2,444,584 (=U.S. Pat. No. 4,022,748) describes impact-resistant moulding compositions having improved stability to oxidation and ultraviolet light, as well as improved shrinkage behaviour which are composed of linear saturated polyesters and graft copolymers, wherein the graft copolymer is produced by grafting essentially styrene and/or methacrylic acid ester onto a prepolymer based on an acrylate and a monomer having two non-conjugated olefinic double bonds.

German Offenlegungsschrift No. 2,726,256 (=U.S. Pat. No. 4,096,202) describes the improvement in the impact strength of polyalkylene terephthalates by certain multiple-stage acrylic polymers in which the first component is an elastomeric component obtained by polymerisation of a monomer system of an alkyl acrylate, a cross-linking monomer and a graft-cross-linking monomer, as well as a last rigid thermoplastic component which has been polymerised in the presence of the first elastomeric component.

The above-mentioned documents say nothing about the impact strength of the moulding compositions described under multi-axial stress even though this is particularly important for the production of impact-stressed housing parts.

The present invention is based on the fact that the impact strength of thermoplastic polyesters under multi-axial stress may be improved by the addition of granular graft products of a highly cross-linked diene rubber core having a first shell of cross-linked acrylic rubber and a second shell of a polymer or copolymer of resin-forming monomers selected from styrene, α-methyl styrene, acrylonitrile, methacrylonitrile, acrylic acid ester, methacrylic acid ester or mixtures thereof.

The present invention relates to moulding compositions having improved impact strength under multi-axial stress comprising:

(A) from 60 to 99%, preferably from 70 to 98%, in particular from 75 to 97%, by weight, (based on (A)+(B)), of a saturated polyester of an aromatic dicarboxylic acid and an aliphatic or cycloaliphatic diol; and (B) from 1 to 40%, preferably from 2 to 30%, in particular from 3 to 25%, by weight, (based on (A)+(B)), of a granular graft product comprising:

(I) a cross-linked diene rubber as core;
(II) a cross-linked acrylate rubber as first shell; and
(III) a homo- or co-polymer of resin-forming monomers selected from styrene, α-methyl styrene, acrylonitrile, methacrylonitrile, acrylic acid ester, methacrylic acid ester or mixtures thereof as second shell.

The weight ratio of core (I) to the first shell (II) is from 0.1:99.9 to 80:20, preferably from 10:90 to 50:50. The second shell (III) contains from 10 to 80%, preferably from 20 to 50%, by weight, based on (B), of graft product (B). The graft products (B) used according to the present invention generally have average particle diameters ($d_{50}$) of from 0.05 to 3 μm, preferably from 0.1 to 2 μm. Particle diameters of from 0.2 to 1 μm are particularly preferred.

The average particle diameter $d_{50}$ is the diameter above and below which there lie 50%, by weight, of the particles. It may be determined by ultra-centrifuge measurement (W. Scholtan, H. Lange, Kolloid, Z. and Z. Polymere 250 (1972), 782–796) or by electron microscopy and subsequent counting out of particles (G. Kämpf, H. Schuster, Angew. Makromolekulare Chemie 14, (1970), 111–129), or by light scatter measurement.

The core material (I) is a cross-linked rubber composed of one or more conjugate dienes, such as polybutadiene or a copolymer of a conjugated diene with an ethylenically unsaturated monomer, such as styrene and/or acrylonitrile.

The first shell (II) is a cross-linked acrylate rubber and is, in particular, a cross-linked polymer of acrylic acid alkyl esters, optionally mixed with up to 40%, by weight, of other vinyl monomers. Suitable polymerisable acrylic acid esters include $C_1$–$C_8$ alkyl esters, for example methyl, ethyl, butyl, octyl, and 2ethylhexyl esters, halogen alkyl esters, preferably $C_1$–$C_8$ halogen alkyl esters, such as chloroethyl acrylate, and aromatic esters, such as benzyl acrylate and phenylethyl-acrylate. They may be used individually or as a mixture.

For cross-linking purposes, polyfunctional monomers are copolymerised. Examples include esters of unsaturated carboxylic acids with a polyol (preferably having from 2 to 20 carbon atoms in the ester group) such as ethylene glycol dimethacrylate; esters of a polybasic carboxylic acid with an unsaturated alcohol (preferably having from 8 to 30 carbon atoms in the ester radical), such as triallyl cyanurate and triallyl isocyanurate; divinyl compounds, such as divinyl benzene; esters of unsaturated carboxylic acids with unsaturated alcohols (preferably having from 6 to 12 carbon atoms in the ester radical), such as allyl methacrylate; phosphoric acid esters, for example triallyl phosphate; 1,3,5-triacryloyl hexahydro-s-triazine and diallyl phthalate. Preferred polyfunctional monomers include allyl methacrylate, ethylene glycol dimethacrylate, diallyl phthalate and cylic compounds containing at least three ethylenically unsaturated groups.

Particularly preferred polyfunctional monomers include the cyclic monomers, such as triallyl cyanurate, triallyl isocyanurate, trivinyl cyanurate, 1,3,5-triacryloyl hexahydro-s-triazine, trivinyl benzenes and triallyl benzenes.

The quantity of polyfunctional monomers used for cross-linking purposes is preferably from 0.05 to 10%, by weight, more particularly from 0.1 to 5%, by weight, based on the weight of the first shell (II). The elastomer in the first shell (II) may additionally contain a further copolymerisable monomer or several such monomers of the vinyl or vinylidene type polymerised therewith, such as acrylonitrile, styrene, α-methyl styrene, acrylamides and vinyl alkyl ethers. These comonomers may be polymerised in quantities of up to 30% by weight, based on the first shell (II).

The second shell (III) is a graft copolymerised polymer of monomers, such as α-methyl styrene, styrene, acrylonitrile, methyl methacrylate or a copolymer of mixtures of these monomers. Copolymers of styrene and acrylonitrile in a ratio, by weight, of from 90:10 to 50:50 and a polymethyl methacrylate are preferred.

The granular graft products (B) may be produced in aqueous emulsion in the following manner:

The diene rubber for the core (I) is initially produced in latex form by emulsion polymerisation of a conjugated diene. The polymerisation process is known. The acrylate rubber for the first shell (II) is then produced in the presence of the diene rubber latex, also in an aqueous emulsion, by emulsifying the monomer or the monomers in the latex and by carrying out polymerisation in a known manner in the presence of radical-forming initiators. The acrylate rubber polymerises onto the diene rubber. It may be crossed-linked during production by the concurrent use of polyfunctional monomers.

During this graft copolymerisation of the first shell (II), the formation of new particles must be prevented as completely as possible. An emulsion stabiliser must be present in a quantity sufficient to cover the surface of the particles. The size of these particles should be varied within wide limits by control of the reaction. If an agglomerated latex is used as core (I) in order to obtain large granules, these granules may contain several diene rubber particles. Polymerisation of the first shell (II) may also be carried out in such a way that particles having a diene rubber core and, at the same time, particles of pure cross-linked acrylate rubber may be produced. Such mixtures may also be used for the production of the moulding compositions according to the present invention under certain circumstances.

Upon completion of graft copolymerisation of the acrylate rubber, a vinyl monomer or a mixture of vinyl monomers of the above-mentioned type are emulsion polymerised onto the latex obtained. The graft products (B) are formed in this process with formation of the second shell (III). During this known graft copolymerisation process, which is usually carried out in the presence of radical initiators, for example water-soluble initiators, emulsifiers or complex-forming agents/graft activators and regulators, free polymers and copolymers of the monomers forming the second shell (III) are generally formed to a certain extent in addition to the actual graft copolymer. The amount of the ungrafted polymer may be determined by the degree of grafting and the grafting yield. This depends, among other factors, on the polymerisation conditions, the composition of the first shell (II), the size of the granules to be grafted and quantity of grafted acrylate rubber.

Graft products (B) in the context of the present invention is therefore the product obtained by polymerisation of vinyl monomers in the presence of the rubber latex, i.e. strictly speaking a mixture of graft copolymer and free copolymer of the graft monomer, independently of the degree of grafting.

The graft products (B) produced in this way may be worked-up by known processes, for example by coagulation of the latices with electrolytes (salts, acids or mixtures thereof) and subsequent purification and drying or by so-called "spray drying".

Saturated polyesters in the context of the present invention are condensation products of aromatic dicarboxylic acids (or derivatives thereof) and aliphatic or cycloaliphatic diols, in particular polyalkylene terephthalates, which may be obtained by known processes from terephthalic acid (derivatives) and (cyclo) alkylene diols having from 2 to 10 carbon atoms, (see, for example Kunststoff-Handbuch, Vol. VIII, pages 695 et seq, Carl-Hanser-Verlag, Munich 1973 and the literature references given herein). Polyethylene terephthalate and poly(1,4-butylene terephthalate) are preferred polyalkylene terephthalates. The polyalkylene terephthalates may also contain up to 10 mol % of another dicarboxylic acid component (aromatic and/or aliphatic and/or araliphatic dicarboxylic acid) and diols (aromatic and/or aliphatic and/or araliphatic diols) instead of the terephthalic acid component. Moreover, the thermoplastic polyesters may be branched by carboxylic acids or polyols having more than two reactive groups.

A condition for using the saturated polyesters is a sufficiently high molecular weight, characterised by an intrinsic viscosity of from 0.5 to 2.0 dl/g, preferably from 0.6 to 1.5 dl/g, more particularly from 0.7 to 1.3 dl/g, measured using a mixture of phenol and o-dichlorobenzene (50/50%, by weight) at 20° C. in a Ubbelohde viscosimeter.

Mixtures of homo- or copolyesters can also be used as component (A). Preferred mixtures comprise (a) from 1 to 99, preferably from 10 to 80, in particular from 30 to 60, % by weight of polyethylene terephthalate and (b) from 99 to 1, preferably from 90 to 20, in particular from 70 to 40, % by weight of poly(butane-1,4-diol terephthalate).

The polyester moulding compositions according to the present invention may contain conventional additives, such as lubricants and release agents, nucleation agents, stabilisers, fillers and reinforcing agents, flame-proofing agents and dyes.

The filled and reinforced polyester moulding compositions may contain up to 60%, by weight, based on the moulding composition, of a filler and/or reinforcing agent. Glass fibres are preferred reinforcing agents. Preferred fillers, which may also have a reinforcing effect, include glass beads, mica, silicates, quartz, talcum, titanium dioxide and wollastonite.

The polyester moulding compositions provided with flame-proofing agents include flame-proofing agents in a concentration generally of less than 30%, by weight, based on the moulding composition.

All known flame proofing agents may be used, such as polyhalogen diphenyl, polyhalogen diphenylether, polyhalogen phthalic acid and derivatives thereof and polyhalogen polycarbonates, the corresponding bromine compounds being particularly effective. Furthermore, they generally contain a synergist, such as antimony trioxide.

The moulding compositions according to the present invention may be produced in conventional mixing apparatus, such as rollers, kneaders, single- and multiple-shaft extruders. Double-shaft extruders are particularly suitable.

The moulding compositions may be produced in known mixing apparatus by melting and homogenising the two components (A) and (B) together or by incorporating the graft product (B) into the melt of the polyester (A).

The temperature should be at least 10° C., preferably at most 80° C. above the melting point of the polyester during production of the mixtures.

In one advantageous process, a mixture of from 35 to 95% by weight and preferably from 50 to 90% by weight (based on components A+B) of graft product (B) and from 5 to 65% by weight and preferably from 10 to 50% by weight (based on components A+B) of polyester (A) is prepared in a first step in one of the above-mentioned mixing units and the resulting mixture is further processed with more polyester (A) in a second step to form the moulding compositions according to the invention.

The polyester moulding compositions according to the present invention are characterised, even with low contents of graft product (B), by a considerable improvement in the impact strength under multi-axial stress, even in the case of polyesters having a relatively low molecular weight. The high strength of the weld line is also surprising for the mixtures. In addition, the moulding compositions are characterised by a high dimensional stability to heat and a surprisingly high resistance to ageing in hot air.

In view of the property profile, the moulding compositions according to the present invention may therefore be used in injection moulding and extrusion wherever high multi-axial toughness in combination with high heat resistance and high hot air resistance is required, for example in parts of appliances under the bonnets of motor vehicles and in heat-stressed household appliances.

The following examples illustrate the present invention.

EXAMPLES (1) Production of the polydiene latices (core (I))

(a) The following emulsion is polymerised in a reactor at 65° C. to virtually complete monomer conversion over about 22 hours, with stirring:

| 100 parts, by weight, | butadiene |
|---|---|
| 1.8 parts, by weight, | Na-salt of disproportionated abietic acid |
| 0.257 parts, by weight, | sodium hydroxide |
| 0.3 parts, by weight, | n-dodecylmercaptan |
| 1.029 parts, by weight, | Na-ethylene diamine tetraacetate |
| 0.023 parts, by weight, | potassium persulphate |
| 760 parts, by weight, | water |

A latex containing polybutadiene granules having an average diameter ($d_{50}$) of 0.1 μm is obtained in a concentration of from 35 to 36% (latex Ia).

(b) The following emulsion is polymerised in accordance with the instructions in (1) (a) at from 60° to 68° C. over about 110 hours:

| 100.0 parts, by weight, | butadiene |
|---|---|
| 70 parts, by weight, | water |
| 1.146 parts, by weight, | Na-salt of disproportionated abietic acid |
| 0.055 parts, by weight, | Na-ethylene diamine tetraacetate |
| 0.137 parts, by weight, | sodium hydroxide |
| 0.028 parts, by weight, | sodium hydrogen carbonate |
| 0.282 parts, by weight, | potassium persulphate |

A latex containing polybutadiene granules having an average diameter ($d_{50}$) of 0.4 μm is obtained in a concentration of about 58% (latex 1b).

(2) Production of acrylate rubber particles containing polybutadiene cores (core (I) with first shell (II))

(a) The following mixture is placed in a reactor with stirring at 63° C.:

| 200 parts, by weight, | latex (1)(a) |
|---|---|
| 5,000 parts, by weight, | water |
| 14 parts, by weight, | potassium persulphate |
| 0.9124 parts, by weight, | triallyl cyanurate |
| 399.09 parts, by weight, | n-butyl acrylate |

The following mixtures are introduced separately into the reactor over 5 hours at 63° C.:

| Mixture (A): | 90 parts, by weight, | Na—sulphonate of $C_{14}$-$C_{18}$ hydrocarbons |
|---|---|---|
| | 11.900 parts, by weight, | water |
| Mixture (B): | 23.09 parts, by weight, | triallyl cyanurate |
| | 10.101 parts, by weight, | n-butyl acrylate |

The mixture is then polymerised for three hours at 63° C. The polymers formed have gel contents of from 85 to 95%, by weight[1], and average granule diameters $d_{50}$ of 0.5 μm (latex (2)(a)).

[1]measured in dimethyl formamide at 25° C. (M. Hoffmann, H. Krömer, R. Kuhn, Polymeranalytik I und II, Georg Thieme Verlag Stuttgart 1977).

(b) The following are placed in a reactor at 65° C.:

| 2168 parts, by weight, | latex (1)(b) |
|---|---|
| 9500 parts, by weight, | water |
| 27 parts, by weight, | potassium persulphate |
| 1700 parts, by weight, | water |

The following mixtures are introduced into the reactor separately over four hours at 65° C.:

| Mixture (C): | 9214 parts, by weight, | n-butyl acrylate |
|---|---|---|
| | 15 parts, by weight, | triallyl cyanurate |
| Mixture (D): | 6600 parts, by weight, | water |
| | 156 parts, by weight, | Na—sulphonate of $C_{14}$-$C_{18}$ hydrocarbons. |

The mixture is then allowed to polymerise for four hours at 65° C. The polymers formed have a gel content of 91%, by weight[1], a degree of swelling of 6.5[1] and a wide distribution of the average granule diameters of from 0.2 to 0.9 μm (latex (2)(b)), determined by ultracentrifuge measurement.

[1]measured in dimethyl formamide at 25° C. (M. Hoffmann, H. Krömer, R. Kuhn, Polymeranalytik I und II, Georg Thieme Verlag Stuttgart 1977).

(3) Production of the graft product (B)

The following are placed in a reactor and heated to 65° C.:
 a parts, by weight, latex (2)(a) and (2)(b)
The reaction is initiated with a mixture of
 b parts, by weight, potassium persulphate
 c parts, by weight, water
The following mixtures are introduced into the reactor with stirring over four hours at 65° C.:

| Mixture E: | d parts, by weight, | monomer 1 |
|---|---|---|
|  | e parts, by weight, | monomer 2 |
| Mixture F: | f parts, by weight, | water |
|  | g parts, by weight, | Na—sulphonate of $C_{14}$–$C_{18}$ hydrocarbons |

Table 1 gives a compilation of the reactants for graft products (B) with types K, L and M.

TABLE 1

| Type | Latex Type | Graft product (B) | | | | | | |
|---|---|---|---|---|---|---|---|---|
|  |  | a | b | c | d |  | e | f | g |
| K | (2)(a) | 3088 | 3.5 | 145 | 273 | MMA | — | 880 | 5 |
| L | (2)(a) | 3088 | 3.5 | 145 | 76.4 | AN | 196.6 | S 880 | 5 |
| M | (2)(b) | 1300 | 18 | 1400 | 311 | AN | 799 | S 120 | 22 |

Numerical data from a–g in parts, by weight
MMA = methyl methacrylate
AN = acrylonitrile
S = styrene The mixture is then polymerised for four hours at 65° C.

The graft product latices (K) to (M) are coagulated after addition of an aqueous stabiliser dispersion corresponding to from 0.25 to 1 part, by weight, of a phenolic antioxidant per 100 parts, by weight, of latex solids, by addition of an electrolyte or acid. The resultant powders are dried under vacuum at 70° C.

(4) Production of comparison graft products

Graft product, type (N)
Copolymer of n-butyl acrylate and the acrylic acid ester of tricyclodecenyl alcohol with graft branches of 75%, by weight, of styrene and 25%, by weight, of acrylonitrile (according to German Offenlegungsschrift No. 2,444,584).

Graft product, type (O)
Copolymer of a graft base composed of:
69.45 parts, by weight, n-butyl acrylate
0.35 parts, by weight, 1,3-butylene diacrylate
0.28 parts, by weight, allyl methacrylate
and a graft shell composed of:
19.95 parts, by weight, methyl methacrylate
9.97 parts, by weight, allyl methacrylate
(according to German Offenlegungsschrift No. 2,726,256).

(5) Production of the mixtures

The following polyesters are melted on a continuously operating twin-screw extruder manufactured by Messrs. Werner and Pfleiderer (Type ZSK 32):
 Type (P): Poly(1,4-butylene-terephthalate) having an intrinsic viscosity of 0.95 dl/g[1]
 Type (Q): Poly(1,4-butylene-terephthalate) having an intrinsic viscosity of 1.15 dl/g[1]
 Type (R): Polyethylene terephthalate having an intrinsic viscosity of 0.80 dl/g[1]

[1] measured in a Ubbelohde viscosimeter in phenol/o-dichlorobenzene (1:1 parts, by weight) at 25° C.

The graft product (B) was introduced into the polyester melt through a second inlet nozzle. a nitrogen atmosphere is beneficial. The graft product (B) was dispersed homogeneously in the melt. It may be advantageous to degas the melt before it issues from the die. The cylinder temperatures were selected in such a way that a mass temperature of 255° C. was provided in the case of poly(1,4-butylene-terephthalate) and of 275° C. in the case of polyethylene terephthalate. The strand of melt containing the mixture of polyester and graft products was cooled in water, granulated and dried. Standard small test bars (according to DIN 53 453) and plates of 3×60×60 mm were injection-moulded at the following processing temperatures on a conventional injection moulding machine.
 Poly(1,4-butylene-terephthalate)-mixture: mass temperature 260° C., moulding temperature 80° C.
 polyethylene terephthalate mixture: mass temperature 275° C., mouldng temperature 140° C.

The impact strength and notched impact strength (according to DIN No. 53 543), ball indentation hardness (according to DIN No. 53 456), dimensional stability to heat according to Vicat (according to DIN No. 53 460), as well as the impact strength under multi-axial stress by the EKWA test (according to DIN No. 53 443, page 2, impact penetration of a plate measuring 3×60×60 mm by a weight of 35 kg with a penetrating pin having a spherical tip, diameter 20 mm, at a falling height of 1 m) was tested. The weld line strength was tested by the tensile test (according to DIN No. 53 455) on tension rods joined by injection at both ends. The results are compiled in the Table.

| | Composition | | | $a_k$[1] | $H_c$[2] | Vicat B | EKWA[3]-Test | Number of tough |
|---|---|---|---|---|---|---|---|---|
| | polyester | | Graft product | | | | | |
| | Type | % | Type | % | KJ/m² MPa | °C. | W. sec | breakages |
| Examples | | | | | | | | |
| 1 | P | 95 | K | 5 | 3.2 | 112 | 179 | 90 | 90 |
| 2 | P | 90 | K | 10 | 4.5 | 103 | 165 | 109 | 100 |
| 3 | P | 97 | L | 3 | 3.5 | 117 | 175 | 92 | 90 |
| 4 | P | 95 | L | 5 | 4.0 | 110 | 170 | 111 | 100 |
| 5 | P | 90 | L | 10 | 6.0 | 101 | 163 | 107 | 100 |
| 6 | P | 80 | L | 20 | 13.0 | 79 | 134 | 99 | 100 |

-continued

| | Composition | | | | $a_k^{(1)}$ | $H_c^{(2)}$ | Vicat B | EKWA$^{(3)}$-Test | Number of tough |
|---|---|---|---|---|---|---|---|---|---|
| | polyester | | Graft product | | | | | | |
| | Type | % | Type | % | KJ/m² | MPa | °C. | W. sec | breakages |
| 7 | P | 70 | L | 30 | 16.8 | 60 | 116 | 94 | 100 |
| 8 | P | 80 | M | 20 | 13.5 | 77 | 134 | 101 | 100 |
| 9 | Q | 80 | L | 20 | 13.8 | 76 | 135 | 105 | 100 |
| 10 | R | 95 | L | 5 | 3.5 | 128 | 173 | 109 | 90 |
| 11 | R | 90 | L | 10 | 5.2 | 120 | 169 | 106 | 100 |
| Comparison examples | | | | | | | | | |
| 12 | P | 100 | — | — | 2.3 | 123 | 182 | 15 | 0 |
| 13 | P | 95 | N | 5 | 2.5 | 108 | 171 | 32 | 20 |
| 14 | P | 95 | O | 5 | 2.6 | 109 | 172 | 37 | 30 |

*The test of impact strength gave the result "unbroken" for the samples in all Examples
The weld line strength$^{(4)}$ of all samples was 100%
$^{(1)}$Notched impact strength
$^{(2)}$Ball indentation hardness
$^{(3)}$EKWA: Electronic force/path recording [elektronische Kraft/Weg-Aufnahme]
$^{(4)}$ $\frac{\text{tensile strength weld line 100}}{\text{tensile strength without weld line}}$

We claim:
1. Thermoplastic polyester moulding compositions composed of:
(A) from 60 to 99%, by weight, (based on (A)+(B)) of at least one saturated polyester of an aromatic dicarboxylic acid and an aliphatic or cycloaliphatic diol; and
(B) from 1 to 40%, by weight, (based on (A)+(B)) of a granular graft product composed of:
(I) a cross-linked diene rubber as core;
(II) a cross-linked acrylate rubber as first shell; and
(III) a polymer or copolymer of resin-forming monomers selected from the group consisting of styrene, α-methyl styrene, acrylonitrile, methacrylonitrile, acrylic acid ester, methacrylic acid ester and mixtures thereof as second shell.

2. Thermoplastic polyester moulding compositions according to claim 1, characterised in that the ratio of core (I) to the first shell (II) is from 0.1:99.9 to 80:20 parts, by weight.

3. Thermoplastic polyester moulding compositions according to claim 1, characterised in that the proportion of the second shell (III) to the total graft product (B) is from 10 to 80%, by weight.

4. Thermoplastic polyester moulding compositions according to claim 1, characterised in that the second shell (III) consists of mixtures of styrene and acrylonitrile.

5. Thermoplastic polyester moulding compositions according to claim 1, characterised in that the second shell (III) consists of methyl methacrylate.

6. Thermoplastic polyester moulding compositions according to claim 1, characterised in that the first shell (II) is cross-linked with cyclic monomers containing at least three ethylenically unsaturated groups.

7. Thermoplastic moulding compositions according to claim 1, characterised in that the polyester is polyethylene terephthalate.

8. Thermoplastic polyester moulding compositions according to claim 1, characterised in that the polyester is poly(1,4-butylene-terephthalate).

9. Thermoplastic polyester moulding compositions according to claim 1, characterised in that the moulding compositions contain up to 60%, by weight, of glass fibres.

10. Thermoplastic polyester moulding compositions according to claim 1, characterized in that the polyester is a mixture comprising
(a) from 1 to 99% by weight of polyethylene terephthalate and
(b) from 99 to 1% by weight of poly-(butane-1.4-diol terephthalate.

* * * * *